Figure 1:
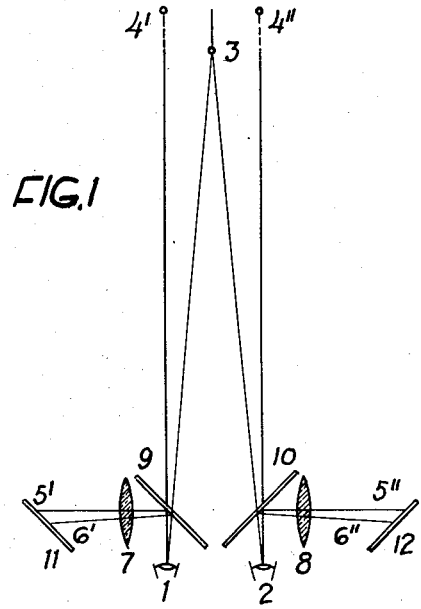

Dec. 29, 1959     E. A. WILKENSON     2,918,855
STEREOSCOPIC RANGE FINDER, PARTICULARLY FOR CAMERAS
Filed July 12, 1955     2 Sheets-Sheet 1

INVENTOR.
Erik Alvar Wilkenson
BY

Dec. 29, 1959   E. A. WILKENSON   2,918,855
STEREOSCOPIC RANGE FINDER, PARTICULARLY FOR CAMERAS
Filed July 12, 1955   2 Sheets-Sheet 2
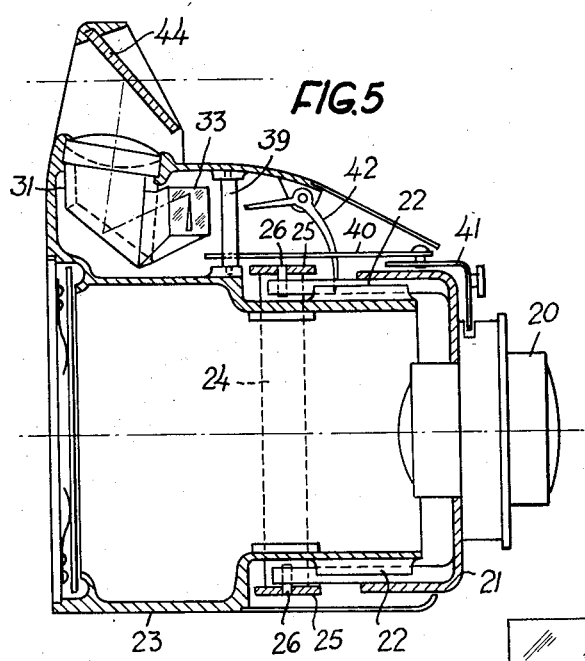
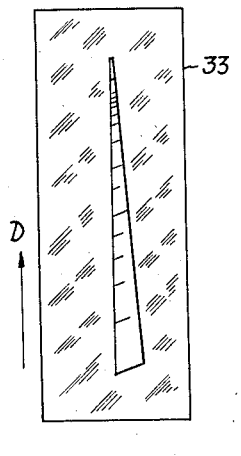
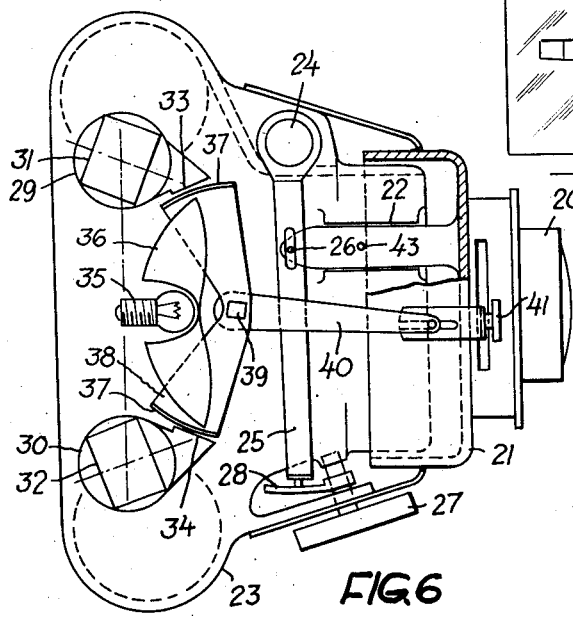
INVENTOR.
Erik Alvar Wilkenson
BY
Attorney

United States Patent Office 2,918,855
Patented Dec. 29, 1959

2,918,855

STEREOSCOPIC RANGE FINDER, PARTICULARLY FOR CAMERAS

Erik Alvar Wilkenson, Geneva, Switzerland

Application July 12, 1955, Serial No. 521,585

Claims priority, application Sweden July 13, 1954

7 Claims. (Cl. 95—44)

In connection with photographic cameras, film cameras, television cameras, and so forth, optical range finders of a monocular type have been chiefly used hitherto, wherein the light rays coming from the field of view into two laterally displaced objectives are combined by means of an adjustable optical system into a common ocular. By an adjustment such that the two part images of some sharply rendered object in the image field appear to coincide, a measure is obtained of the distance to the object in question. Such range finders exist both as separate accessories for cameras and as built in units coupled functionally with the range adjustment of cameras. However, these instruments suffer from considerable deficiencies, in that they are, for instance, unsuitable for measuring toward objects with undefined outlines or under poor illumination, or toward moving objects. Furthermore, neither the magnitude of the measured distance nor the necessary accuracy of the range adjustment can be indicated in a suitable manner in the field of view.

Stereoscopic range finders have been suggested previously for use with or as a part of cameras, but in their proposed forms they could not obviate said difficulties, and have also brought further difficulties along with them. Stereoscopic range finders utilize the ability of man to judge distances by binocular vision, and consist of two optical systems, each of which generates a stereoscopic half-image of a plurality of range marks in the field of view. In the hitherto existing constructions it has been necessary to judge the apparent location of one or more of these marks relatively to the motive, i.e., the object sighted upon; and to obtain a correct result it has been necessary to adjust the instrument for the interpupillary distance of every user.

The present invention which refers to a stereoscopic range finder intended particularly for cameras, has for its object to obviate said deficiencies and to introduce further technical advantages. More specifically, it is an object of the present invention to provide a stereoscopic range finder wherein the field of view is seen binocularly by the viewer, and wherein the viewer also sees, stereoscopically, a pair of elongated range scale images, having the appearance of being superimposed upon the field of view and convergingly receding from him, and by the apparent point of intersection of which images the distance may be determined to any object in the field of view upon which the viewer binocularly fixes his eyes.

Another object of this invention resides in the provision of a stereoscopic range finder of the character described wherein a predetermined portion of at least one of the elongated range scale images may be visually designated, and which portion corresponds to a predetermined distance or distance zone, so that the image of said portion of the one range scale will appear to intersect the image of the other only when the viewer fixes his eyes binocularly upon objects in the field of view which are at such predetermined distance from him, or within such distance zone.

From the preceding object it follows that it is another object of this invention to provide a stereoscopic range finder which is particularly adapted for use with cameras and similar devices having an objective lens which is axially adjustable for focusing upon objects at different distances, and whereby a viewer may determine solely by observing the images and field of view visible in the range finder whether or not a given object within the field of view is at the distance for which the objective lens is adjusted.

It is another object of this invention to provide a stereoscopic range finder of the character described wherein a portion or portions of the stereoscopically viewed images of the range defining marks may be designated to correspond to both the focus setting of an objective lens and the aperture setting thereof (adjustment of the designating means being effected automatically if desired), so as to give the viewer a direct visual indication of whether or not a particular object within the field of view of the range finder is within the distance zone at which the image formed by the objective lens is in sharp focus.

A further object of this invention resides in the provision of a stereoscopic range finder of the character described wherein no adjustment is required to accommodate the interpupillary distances of different users.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 2:
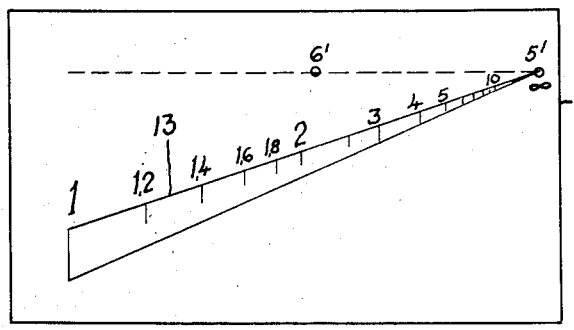
Figure 4:
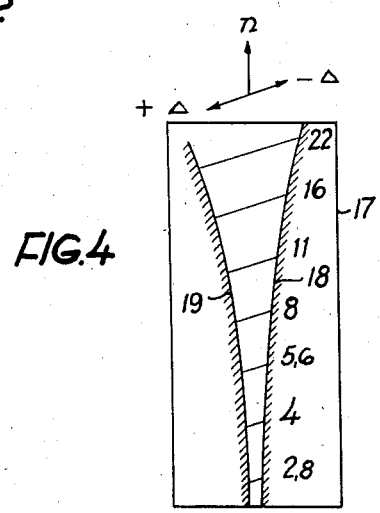
Figure 3:
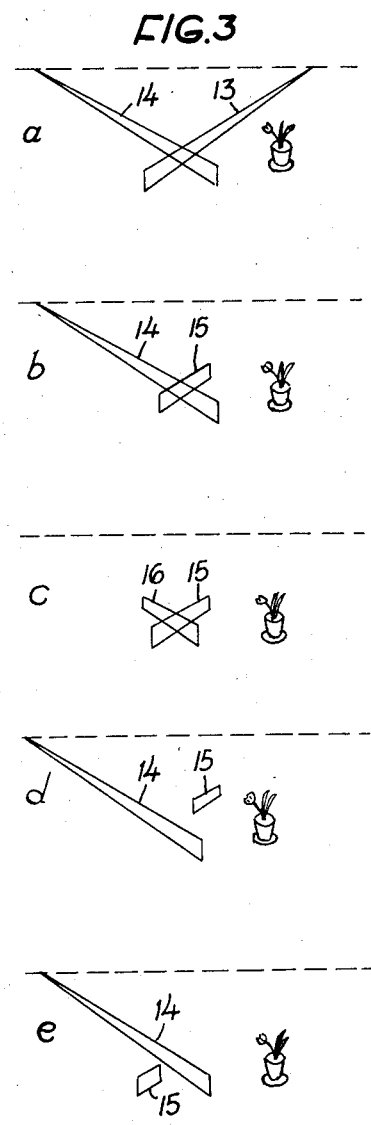

The accompanying drawings illustrate two complete examples of the physical embodiments of the invention constructed according to the best modes so far devised for the practical application of the principles thereof, and in which:

Figure 1 is a diagrammatic plan view of one embodiment of the invention; Fig. 2 shows a plate with range marks; Fig. 3 illustrates how the range marks of the stereoscopic range finder appear to the user under varying conditions; Fig. 4 is a diagrammatic view of a plate for adjustably designating a predetermined part of the range mark; Fig. 5 is a vertical sectional view of a camera incorporating an embodiment of the range finder of this invention; Fig. 6 shows the same camera viewed from above, with portions cut away; Fig. 7 shows a detail of one range mark surface of the range finder shown in Figs. 5 and 6; and Fig. 8 shows a detail of the designating device in the same range finder.

In the system according to Fig. 1, 1 and 2 designate the eyes of the user, which are reached by the rays from an object 3 and from an object 4 in the field of view, the latter being at an infinite distance and therefore only the rays therefrom are shown and denoted in the figure as 4' and 4". Furthermore, the eyes are reached by rays from the radiant points 5' and 5" and 6' and 6" through the lenses 7 and 8 and the transparent but semi-reflecting glass plates 9 and 10. If the points 5' and 5" are placed at the focal plane of the lenses and the mirrors are properly adjusted, the eye 1 perceives a virtual image of the point 5' coinciding with the point 4' infinitely far off, while the eye 2 perceives a virtual image of the point 5" coinciding with the point 4" infinitely far off. The observer receives the impression that he sees a radiant point, which we might designate with 5, standing out at an infinite distance. If the rays thus described be called central rays, corresponding rays from the points 6' and 6" may, by reason of the lateral displacement of the points 6 relatively to 5, appear to the eyes as emanating, on having passed through the lenses and on having been reflected by the glass plates 9 and 10, from a distance corresponding to the point designated by 3.

Stereoscopic range finders are frequently provided with mirror systems to increase the basis of the measurements from the natural interocular distance, whereby a greater accuracy may be obtained. For use in connection with cameras, however, this is generally unnecessary with respect to the accuracy, and for this reason the embodiments herein shown utilize the interocular distance of the user as a basis for the measuring of the range.

However, different persons have different distances between their eyes. To make unnecessary a special correcting device on the range finder with respect to this circumstance, and also to provide for more convenient use of the instrument, the optical system of the range mark imaging means according to the invention is constructed in the following manner. A measuring mark 6' which is intended to represent a certain distance, in this case to the point 3, is located in such manner inside the focal plane of the lens 7 that the virtual image becomes sharp at the considered distance to 3. Thereby all rays from the virtual image of the point 6' appear to emanate from the point 3 independently of the exact location of the eye in a lateral direction, that is to say, the two eyes 1 and 2 may be displaced relative to one another or together, but the position of the virtual image 6 will appear to remain at the point 3. This is an important arrangement to facilitate the use of the range finder by different persons without any special interocular adjustments for the interpupillary distance. To attain the desirable focusing of the point 6, it should thus be located nearer to the lens than the central point 5. This location in the focal direction is easy to calculate for a given lens system, and is frequently of the same magnitude as the outward displacement of the point 6 from the central ray to bring about the proper convergence of the beam of rays corresponding to the rays from the point 3. The marks 5 and 6 may preferably be located on the plates 11 and 12 which are substantially plane but may otherwise be constructed in various ways, but here it always holds true that the desired effect is obtained by the plates being positioned obliquely to the optical axis of the lens system.

Fig. 2 shows the plate 11 (or, specularly, the plate 12) viewed from the lens. The marks 5' and 6' correspond to the marks above described. The mark 6' has been incorporated principally for the purpose of elucidating the principle of stereoscopic range finders such as they are generally arranged with fixed or movable range marks. In connection with the present invention it has proved more appropriate, however, to form the mark as an elongated scale 13, which is substantially straight and rendered perspectively to facilitate the impression of stereoscopic depth. A graduation may be provided, but is not important for certain embodiments of the invention. If this scale is disposed as a horizontal line on the two mark plates 11 and 12 in Fig. 1, the observer receives the impression of a measuring-tape extending from infinitude straight toward him. If the scale is caused to slope as shown in Fig. 2 (and correspondingly on the other plate 12) the observer will see the measuring-tape extending slightly downwards toward him. By adapting this inclination one may cause the measuring-tape to be apparently directed toward the objective of a camera, on which the range finder is mounted; this is of particular advantage in an embodiment of the invention where the range finder is combined with the view finder of the camera, an indication being then obtained of the parallax between the view finder and the objective.

The two marks in the form of elongated scales at 11 and 12 in Fig. 1 appear to the observer as illustrated in Fig. 3. In Fig. 3a, 13 thus designates the image seen by the right-hand eye, whereas 14 denotes the left-hand image. These stereoscopic half-images are coalesced by the faculty of vision to the conception of a range scale located in the space, and one may let the eye look along the scale, the eyes then always having to accommodate themselves for the very distance corresponding to the convergence of the eyes, according to the description hereinabove. This corresponds exactly to the natural seeing toward an object with a depth extension. Now, if the eyes be directed toward a particular object in the field of view, the two eyes will converge so that the stereoscopic part images of this object coalesce. In Fig. 3, such an object is indicated, to which the eyes are directed. The images of the range scale will then appear as indicated by the position of the scales 13 and 14 in Fig. 3a, the same then obviously presenting the appearance of intersecting at the distance at which the object upon which the eyes are fixed is located. If the scales are graduated, the distance may thus be read off at the point of intersection. The best accuracy will then be obtained if the scales are made as edgewise erected thin bands.

In certain fields of use for range finders no information is required as to the exact distance to an object, whereas information is required as to whether or not such object is located within a certain region of the range scale. Such may be the case in range determination for military targets and in range finders for cameras. According to the present invention, special advantages will then be obtained by designating said region directly on at least one of the stereoscopic half-images. This has been done in Fig. 3b with respect to the image seen by the right-hand eye, the greater portion of which has been screened off, so that only the topical region 15 appears in the field of view. In Fig. 3c, both scales are screened off to the topical region. In observing an object in the field of view, the remaining parts of the stereoscopic half-images of the range scale thus appear as shown in Figs. 3b and c, if the object is located within the topical range region, but if such is not the case, the range scales will appear as in Fig. 3d and e, when the object is too near and too far off, respectively. This simple control of the range position of an object is thus obtained according to the invention by utilizing the indirect seeing toward a specially designated section of the range scales. This designation may of course be effected by screening off the remaining parts of the scales or by colour-marking the various parts or by marking or designating them in some other suitable manner within the scope of the inventive concept.

The special designation of a section of the mark or range finder according to the invention may preferably be effected by a transparent plate according to Fig. 4 being placed adjacent to the range mark, so that the light rays to the lens are screened off or are coloured or the like. The marking on the plate 17 is intended to cooperate with the range scale on the plate 11 in Fig. 2, the region between the shaded curves then cutting off a section of the scale 13. The plate 17 is arranged to be adjustably displaced along the scale 13, so that the plate 17 designates or defines a predetermined portion of the elongated range scale, the length of which portion corresponds to the distance between curves 18 and 19 on plate 17 at the points where said curves intersect the range scale marking. Furthermore, the plate 17 is adapted to be displaced crosswise of the scale 13, the curves 18 and 19 marked on the plate 17 then bringing about a variation of the magnitude of the designated section of the scale 13.

This combination of adjusting facilities of the plate 17 is used in range finders for cameras to mark the nominal range adjustment and the region of field depth according to the following. It is simple to show that the graduation of the range scale mark 13 is to follow the formula C/D, where C is a constant combining the geometrical data of the instrument, such as the distance between the oculars and the focal distance of the lenses, and wherein D designates the distance to the object. This is the same type of graduation that is used for the range adjustment of cameras, for which reason the field depth indication used therein is also applicable to the scale 13. According to a commonly known theory for such a field depth scale its tolerance region becomes $$\Delta = \pm C \frac{Z \cdot n}{F^2}$$

where C is the same constant as before, Z is the radius of the circle of dispersion, $n$ is the diaphragm number and, finally, F is the focal length of the objective of the camera. The limit curves 18 and 19 on the plate 17 in Fig. 4 have been computed according to said formula for cooperating with the scale 13, the numeral markings on the plate 17 then corresponding to the diaphragm numbers at the focal length of 80 millimetres.

A camera is preferably coupled mechanically to a range finder according to the invention in such manner that the focus adjustment of the camera is coupled to the movement of the plate 17 along the scale 13, the middle of the designated section of the range scale then having to correspond to the nominal distance, and also in such manner that the diaphragm adjustment of the camera is coupled to the movement of the plate 17 crosswise of the scale 13. The graduation of the plate 17 for the latter movement is not conditioned by anything else than to suit the diaphragm adjustment of the camera objective lens and the focal length thereof, but if a graduation of the diaphragm numbers is chosen to be in a geometrical series (as in Fig. 4), the advantage is obtained that if an objective lens of a different focal length is installed on the camera one may nevertheless continue to use the same plate 17 by merely displacing it in the $n$-direction to suit the new focal length. The significance of the diaphragm graduation on plate 17 will then obviously be altered.

Figs. 5 and 6 show a range finder according to the invention as incorporated in a camera, Fig. 5 being a view in vertical section and Fig. 6 being an upper plan view, partly in section. The objective 20 is mounted in a front plate 21 which is axially displaceably mounted on the camera casing 23 by means of two guides 22. This adjusting facility is used for the focusing of the camera, and in order that the movement shall be smooth and uniform, the same is controlled in known manner by means of a through-shaft 24 with levers 25 carrying pins 26 that engage in slots in the guides 22. The knob 27 is mounted in the camera casing and turns a cam disk 28 adapted to operate the levers 25. The focusing is thus effected by turning the knob 27. The range finder comprises two lenses 29 and 30 and two prisms 31 and 32, which are cut in such manner that the range marked surfaces 33 and 34, respectively, form a prism face, and that the rays therefrom are reflected once, before they reach the lenses. According to the invention, the surfaces 33 and 34 are positioned obliquely with respect to the axes of the optical systems, besides which the angle of reflection of the prisms is selected so that the range scale mark on 33 and the range scale mark on 34 become mutually parallel. Furthermore, the prism surfaces 33 and 34 are selected so that the marks thereon will represent the two vertical sides of an edgewise erected elongated range scale, which, in accordance with the above statements, is advantageous with respect to the accuracy. The marks are made as is shown on an enlarged scale in Fig. 7 with respect to the left-hand image, the shaded portion therein being opaque. The light from a lamp 35 is conveyed by a rigidly mounted light-conducting body 36 toward the prism faces on which the range scale marks are delineated. Therebetween, however, are two designating screens 37, the form of which appears more closely from Fig. 8., where the shaded portions are likewise opaque. These screens are mounted on a bridge 38, which is movable vertically on the square-sectioned shaft 39 and is also constrained to rotate with said shaft about its axis. This shaft is rigidly connected to the arm 40, which is coupled by means of a pin to the diaphragm adjustment 41 of the camera. When the diaphragm is thus adjusted, the bridge 38 is turned, and the designating screens 37 are thereby adjusted so that the proportion of the range scale corresponding to the diaphragm setting is designated as a region of field depth. Furthermore, the lever 42 constitutes a coupling between the focusing adjustment of the camera and the range finder for which purpose an arm 42 is in engagement with the front plate at the hole 43 and controls vertical movement of the bridge 38 along the square-sectioned shaft 39 (the bridge is not shown in Fig. 5, which is also the case with the arm 42 in Fig. 6, for which reason this coupling is not illustrated). Finally, the rays are reflected from the lens systems by the glass 44 toward the two eyes of the user. Otherwise, only those details have been incorporated into the figures which are of direct significance for the connection between the range finder and the camera. To this might be added that illumination of the marks by means of daylight may also be provided for instead of the incandescent lamp shown.

The use of the combination of a range finder and a camera as described is believed to have been clarified by the foregoing descriptive matter. It might be pointed out, however, that the designating screen according to Fig. 8 has been disposed so as to move at right angles to the scale on the mark 33 according to Fig. 7, in spite of the fact that, strictly speaking, the movement ought to have been arranged obliquely as in the coupling of the details 11 and 17 in Figs. 2 and 4. With a suitable formation of the limit curves on the screen 37, the difference becomes small, however, and a mechanical simplification is obtained by the feature that one and the same bridge 38 may guide two screens 37 relatively to the marks 33 and 34. However, if one only desires to designate the region of field depth on one range scale mark, as stated above, the bridge 38 becomes single-acting, and the relative movement between the designation and the range scale marking can be performed entirely correctly.

The above-described embodiment of the range finder according to the invention in combination with a camera only constitutes an example of the invention, which may be varied with respect to the construction and the details thereof and be used for other apparatus as well, where range measurements are required, without the concept of the invention being deviated from thereby.

What I claim is:

1. A stereoscopic range finder of the type having a pair of oculars through which a field of view may be binocularly viewed, and means for superimposing upon the field of view visible through the oculars the images of range markings, by means of which images the distance from the viewer to an object in the field of view may be determined: characterized by the fact that a separate range marking image is visible through each of the oculars; and further characterized by the fact that said range marking images are elongated and are disposed at opposite oblique angles so that when viewed stereoscopically they present the appearance of receding at opposite oblique angles from the viewer and of intersecting at the same distance from the viewer as any object in the field of view upon which the viewer's eyes are fixed.

2. A stereoscopic range finder comprising: means defining a pair of oculars spaced apart a distance to accommodate the eyes of a person using the range finder and through which a visual field may be binocularly viewed; means providing a pair of semi-reflecting surfaces through which light may be transmitted and by which it may be reflected, one of said surfaces being disposed across each of the optical axes defined by the oculars and at an oblique angle to said axis; a pair of optical systems, each including image forming means having a predetermined focal plane; and means defining a pair of indicia carrying surfaces, each having an elongated marking delineated thereon, said surfaces being so disposed with respect to the image forming means of the optical systems and said semi-reflecting surfaces that images of the markings are viewable through each of the oculars, superimposed upon the field of view visible through the ocular, and the markings being so oriented that said images of the markings, when viewed stereoscopically, present the appearance of receding at opposite oblique angles from the person viewing them and intersecting at the same distance from the viewer as any object in the field of view upon which the eyes are binocularly fixed.

3. A stereoscopic range finder comprising: means defining a pair of oculars spaced apart a distance to accommodate the eyes of a person using the range finder and through which a visual field may be binocularly viewed; means disposed across the optical axis of each of the oculars and transparent to light passing along the optical axis of each ocular but having a semi-reflecting surface disposed at an oblique angle to said axis to reflect an image, visible through the ocular, of an object at one side of said axis; means providing a surface having elongated range marking indicia delineated thereon; and image forming means having a predetermined focal plane, said image forming means being so disposed with respect to said surface bearing the range marking indicia and said semi-reflecting surface that at least a portion of the elongated range marking indicia is inside said focal plane, and that an image of said range marking indicia is visible through each of the oculars, which images, when viewed stereoscopically through the oculars, present the appearance of being superimposed upon the binocularly viewed field and of receding from the viewer at opposite oblique angles, intersecting at an apparent distance from the viewer which corresponds to the actual distance to an object in the field upon which the viewer fixes his eyes.

4. In a stereoscopic range finder of the type having a pair of oculars through which a predetermined field may be binocularly viewed, means for superimposing upon the field of view a pair of images of elongated indicia which images, when viewed stereoscopically through the oculars, present the appearance of receding from the viewer at opposite oblique angles and intersecting at the same distance from the viewer as any object in the field of view upon which the viewer's eyes may be fixed, said means comprising: means disposed across the optical axis of each of the oculars and transparent to light passing along said axis so as not to interfere with the fields of view through the oculars, but having a reflecting surface disposed obliquely to said axis to reflect an image, visible through the ocular, of an object at one side of said axis; means comprising a pair of optical systems, each including image forming means having a predetermined focal plane and optical axis, and each so disposed that the image of an object substantially at its focal plane and substantially on its axis is visible through one of the oculars; and means defining an indicia carrying surface disposed to be substantially intersected by the optical axis of each of said optical systems and at least a portion of which is inside the plane of focus of the optical system, said surface having an elongated range marking delineated thereon, so disposed that a virtual image of the range marking is visible through each ocular, said images being so oriented that when viewed through both oculars stereoscopically they present the appearance of receding non-horizontally from the viewer and intersecting.

5. In a stereoscopic range finder of the type having a pair of oculars through which a predetermined field may be binocularly viewed, means for superimposing upon the field of view the images of a pair of elongated indicia which, when viewed stereoscopically through the oculars, present the appearance of receding from the viewer at opposite oblique angles and intersecting at the same distance from the viewer as any object in the field of view upon which the viewer's eyes may be fixed, said means comprising: means disposed across the optical axis of each of the oculars transparent to light passing along said axis so as not to interfere with the fields of view through the oculars, but having a semi-reflecting surface disposed obliquely to said axis to reflect an image, visible through the ocular, of an object at one side of said axis; means defining a pair of optical systems, each including image forming means having a predetermined focal plane and each having an optical axis which intersects said semi-reflecting surface substantially on the axis of one of the oculars; and surface defining means having an elongated range marking thereon, disposed with one end of its range marking at the plane of focus of each of said optical systems and its other end within said plane, and so disposed with respect to the axis of each optical system that said semi-reflecting surfaces reflect a pair of virtual images of the range marking, each of which images is visible through one of the oculars, and which virtual images, when viewed stereoscopically, present the appearance of receding from the viewer at opposite oblique angles and intersecting one another.

6. In a device of the type having an objective lens and means for axially adjusting the same toward and from a relatively fixed plane to enable sharply focused images of objects at different distances from the lens to be formed at said plane, a stereoscopic range finder for indicating whether or not the objective lens is adjusted to produce a properly focused image at said plane of any selected object within its image field, said range finder comprising: means fixed with respect to the device defining a pair of oculars spaced apart a distance to accommodate the eyes of a person using the range finder and through which a field of view, including the field to be imaged by the objective lens may be binocularly viewed through the oculars; means disposed across the optical axis defined by each of the oculars, said means being transparent to light passing along said axis so as not to interfere with perception of the visual field through the ocular, but having a semi-reflecting surface disposed at an oblique angle to said axis and which reflects an image of an object at one side of said axis which is visible in the ocular; means providing a pair of optical systems, each fixed with respect to the oculars and including image forming means having a predetermined focal plane and optical axis, each of said optical systems being so disposed that a virtual image of an object substantially at its focal plane and on its axis is reflected by said semi-reflecting surface and is visible through one of the oculars; means fixed with respect to the oculars defining a pair of indicia surfaces, each disposed obliquely to the axis of one of the optical systems, intersecting the plane of focus of the optical system substantially on its axis and having a portion within said plane, each of said indicia surfaces having an elongated range marking delineated thereon, one end of which is substantially at the intersection of the axis of the optical system with said indicia surface and the remainder of which is on said portion thereof, so that said semi-reflecting surface reflects an image of said marking which is visible through one of the oculars, and each of said markings being so oriented on its indicia surface that the reflected images of the markings, when viewed stereoscopically, present the appearance of receding from the person viewing them at opposite oblique angles and intersecting in the plane of an object in the field of view upon which the eyes are binocularly converged; movable designating means mounted adjacent to one of said indicia surfaces for back and forth movement in a path substantially parallel thereto and substantially lengthwise of said elongated marking thereon, said movable designating means having means thereon cooperable with the elongated range marking for defining a predetermined portion of the reflected image of said elongated marking; and connecting means constraining said movable designating means to back and forth movement in unison with axial adjustment of the objective lens and in such relation to adjusting movement of the latter that the designated portion of the image of said one elongated marking corresponds to the focus distance for which the objective lens is adjusted.

7. The device of claim 6 wherein the objective lens has movable adjustment means for regulating the size of its aperture, by movement of which the depth of the zone of the imaged field which is sharply focused at said plane is varied, further characterized by the fact that said means on the designating means for defining a predetermined portion of the reflected image of said range marking is elongated transversely to the length of the range marking and is of non-uniform width along its length; further characterized by the fact that said designating means is mounted for motion transversely of the length of the range marking, as well as lengthwise thereof; and further characterized by means connecting the lens aperture adjustment means with said designating means to constrain the designating means to move transversely of the elongated range marking in unison with adjusting movement of the adjustment means for the lens aperture and in such relation to movement of the latter that the designated portion of the image of the range marking corresponds to the depth of the zone of the imaged field which is sharply focused at the aperture for which the adjustment means is set.

References Cited in the file of this patent

UNITED STATES PATENTS

| | | |
|---|---|---|
| 1,987,765 | Wandersleb | Jan. 15, 1935 |
| 2,106,631 | Eppenstein | Jan. 25, 1938 |
| 2,404,301 | Land | July 16, 1946 |

FOREIGN PATENTS

| | | |
|---|---|---|
| 180,423 | Switzerland | Oct. 31, 1935 |